United States Patent [19]

Takahashi

[11] Patent Number: 5,032,779

[45] Date of Patent: Jul. 16, 1991

[54] DRIVING CIRCUIT FOR STEPPING MOTOR

[75] Inventor: Shoji Takahashi, Saitama, Japan

[73] Assignee: Citizen Watch Co., Ltd., Tokyo, Japan

[21] Appl. No.: 510,433

[22] Filed: Apr. 18, 1990

[30] Foreign Application Priority Data

Apr. 24, 1989 [JP] Japan .................................. 1-103789

[51] Int. Cl.$^5$ .............................................. H02P 8/00
[52] U.S. Cl. ..................... 318/696; 318/685; 360/78.14
[58] Field of Search .............................. 318/696, 685; 360/78.14

[56] References Cited

U.S. PATENT DOCUMENTS 4,072,888 2/1978 Bechtle et al. ...................... 318/696

Primary Examiner—William M. Shoop, Jr.
Assistant Examiner—Saul M. Bergmann
Attorney, Agent, or Firm—Koda and Androlia

[57] ABSTRACT

A drive circuit for a stepping motor used for seeking the reading/writing head of a floppy disk or the like. The stepping motor is smoothly driven by inserting an inner step pulse between the input step pulses when excitation signals are supplied to the stepping motor on the basis of the step pulses from the host computer. Since the interval between the step pulses output from the host computer is different each time, the interval between the step pulses is measured and the timing for generating an inner step pulse is determined on the basis of the measured value.

12 Claims, 6 Drawing Sheets

STEP PULSE

INNER STEP PULSE

COMPOSITE PULSE

DRIVING CIRCUIT FOR STEPPING MOTOR

BACKGROUND OF THE INVENTION

1. Field of the Invention

The present invention relates to a circuit for a stepping motor and, more particularly, to the improvement of a driving circuit for a stepping motor which enables a smooth seeking by inserting an inner step pulse between the step pulses which are input so as to make the seeking interval smaller than the interval between the input step pulses.

2. Description of the Related Art

Stepping motors which are capable of securing a predetermined amount of rotation and a predetermined rotational position in correspondence with the number of step pulses input are used in various industrial fields to obtain the accurate seeking position. Stepping motors are advantageous in that the accurate positional control is enabled with a simple structure.

Stepping motors are very suitable as carriage driving motors for seeking a reading/writing head of a floppy disk drive, a hard disk drive or the like to a predetermined track.

Various driving systems having various combinations of the number of exciting coils and the number of exciting phases are adopted for such stepping motors. A given driving system is selected from these systems in accordance with the characteristics of the object of control.

FIG. 6 shows a conventional stepping motor having a rotor 10 which carries the main shaft of the motor, and fixed exciting coils 12, 14 having a phase A and a phase B, respectively, and provided around the rotor 10. The main shaft of the motor is driven in steps with a high accuracy by exiting the coils 12, 14 by a predetermined combination of a forward current and a reverse current.

FIG. 7 shows an example of step pulses for driving the stepping motor shown in FIG. 6. In an ordinary case, the stepping seeking is realized by exciting the exciting coils 12, 14 by a different combination of a forward current and a reverse current every time a step pulse is input.

In FIG. 7, when a step pulse $SP_1$ is input, both the exciting coils 12, 14 are excited in the forward direction, in other words, in the phases A and B, and the rotor 10 is positioned at the position indicated by the arrow AB in FIG. 6. When the next step pulse $SP_2$ is input, the exciting coil 12 is excited in the reverse direction while the exciting coil 14 is excited in the forward direction, namely, in the phases $\overline{A}B$, and the rotor 10 is rotated in this state as far as the position indicated by $\overline{A}B$ in FIG. 6. Similarly, when the step pulses $SP_3$ and $SP_4$ are subsequently input, the rotor 10 is positioned at the position $\overline{A}\overline{B}$ and $A\overline{B}$, respectively, by two-phase excitation. In this way, the four seeking positions are obtained during one revolution of the rotor 10 in FIG. 6.

However, in such two-phase excitation, the rotor 10 is subjected to acceleration and deceleration in repetition at every switching of the currents. As a result, the rotational speed of the rotor 10 greatly varies, so that, for example, when the head carried by the carriage of a floppy disk drive is moved to a comparatively distant track, a large speed variation is generated, which leads to the problem such as the loss of energy, generation of a noise and the increase in wear.

In order to eliminate such non-uniform rotation and to obtain a smooth rotor rotation, a method of obtaining a smooth rotation by inserting an inner step pulse at an intermediate position between the input step pulses in the driving circuit of the step motor when the step pulse is received has conventionally been put to practical use.

As shown in FIG. 7, such an inner step pulse is output substantially at the central portion of the interval of step pulses. Therefore, the inner step pulse is formed by adding a predetermined delay time $\tau$ to the pulse interval T of the step pulse SP, and a composite pulse train is produced by compounding the step pulse SP and the inner step pulse. On the basis of this composite pulse train, the exciting coils 12, 14 are excited.

Consequently, in FIGS. 6 and 7, after the excitation in the phases A and B at the step pulse $SP_1$, the exciting coil 14 alone is excited in the forward direction, in other words, B-phase excitation is carried out when the inner pulse is received, whereby the rotor 10 is rotated as far as the position B. Similarly, the subsequent inner pulses are output, and the rotor 10 is rotated to the positions $\overline{A}$, $\overline{B}$ and A, respectively.

According to the two-phase/one-phase excitation including such inner pulses, it is possible to obtain a very smooth rotational operation of the rotor 10.

However, since the delay time of the inner step pulse in the related art is fixed at, for example, $\tau_0$ in FIG. 7, when the pulse interval T of the input step pulse SP is constant, the inner step pulse effectively acts, but when the pulse interval T varies, a large nonuniformity is rather produced on the rotation of the rotor 10.

In FIG. 7, the interval of the step pulse $T_1$ is set at 3 ms. In this case, the stepping motor can be used for seeking the carriage of a floppy disk drive, for example. In the floppy disk drive, the step pulse greatly varies in accordance with the command from the host computer and the type of the program. For example, in FIG. 7, step pulses output at intervals $T_2 = 5$ ms and $T_1 = 3$ ms are supplied and step pulses are input to the same floppy disk drive at different intervals T.

Therefore, in the above-described driving system in which the delay time $\tau_0$ is fixed at 1.5 ms, when step pulses are output at an interval $T_2$ of 5 ms, very irregular drive pulses are provided, which rather produces a large nonuniformity on the rotation of the rotor 10.

SUMMARY OF THE INVENTION

Accordingly, it is an object of the present invention to eliminate the above-described problems in the related art and to provide an improved drive circuit for a stepping motor which is capable of outputting an inner step pulse at the optimum delay time which corresponds to the pulse interval of input step pulses even if the pulse interval is changed.

To achieve this aim, the present invention is characterized in that when step pulses are received, the interval of the step pulses is measured, the delay time is set in correspondence with the measured pulse interval, and the output of an inner step pulse is controlled by the variable delay time.

In an ordinary case, the delay time is set at a half value of the measured interval of the step pulses, thereby enabling an inner pulse to be constantly inserted at an intermediate portion between the step pulses even if the pulse interval varies.

The delay time is varied as desired in accordance with the characteristics of the stepping motor.

According to the present invention, it is possible to set the optimum delay time which corresponds to the measured pulse interval at the latest when the second step pulse is output, thereby enabling a very smooth rotation of the rotor.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiments of the present invention will be explained hereinunder with reference to the accompanying drawings.

Figure 1:
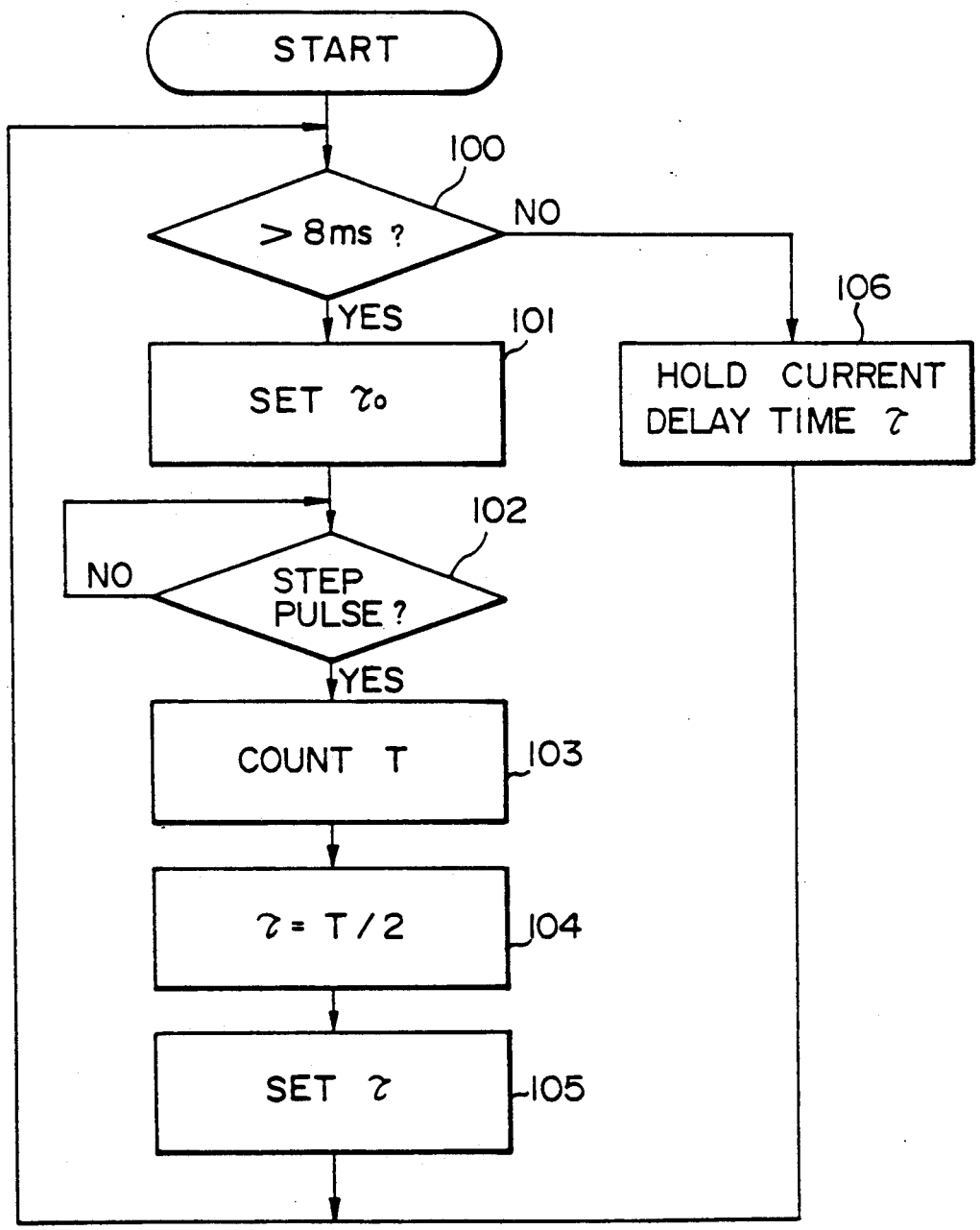
FIG. 1 is a flowchart of an embodiment of a drive circuit according to the present invention which is applied to a floppy disk drive.

FIG. 1 is a flowchart of a driving system in accordance with the present invention. At the step 100, whether or not the reception of a series of step pulses have been finished is judged. In this embodiment, this judgment is made from the judgment as to whether or not the repose time for the step pulse has exceeded a predetermined value.

More specifically, in the embodiment shown in FIG. 1, the stepping motor is used for seeking the carriage of a floppy disk, and whether or not the input step pulse is one of a series of step pulses based on a new command is determined from the judgment as to whether or not a predetermined repose time, 8 ms in this embodiment, exists between the step pulses. If time exceeding the predetermined repose time has elapsed, there is a possibility of the intervals between step pulses being changed in accordance with a new command, thereby requiring the delay time of an inner step pulse to be renewed.

If the repose time for the step pulse has exceeded a predetermined value (8 ms) at the step 100, a predetermined initial value $\tau_0$ is set. In this embodiment, the initial value $\tau_0$ is set at, for example, 1.5 ms at the step 101, and when the interval between the input step pulses is 3 ms, it is selected as the optimum initial value.

The initial value is used only one time until the next step pulse is input. The next step pulse is monitored at the step 102. When the second step pulse is input, the interval T between these step pulses is counted at the step 103.

The pulse interval T is counted by starting to count a predetermined clock pulse at the input of the first step pulse, as well known. When the counting is finished at the input of the second step pulse, the count value indicates the pulse interval T. It goes without saying that the pulse interval T may be counted by any other time counting method.

When the interval T between the input step pulses is obtained in this way, a desired delay time $\tau$ is calculated at the step 104. In this embodiment, the delay time $\tau$ of T/2 is obtained in order to insert an inner step pulse at an intermediate position between the step pulses.

The thus-obtained delay time $\tau$ is set as the delay time at the step 105, and an inner step pulse is inserted at an intermediate position between the step pulses in the same way as in the related art.

The thus-obtained delay time for the inner step pulse is held through the path at the step 106 until the repose time is judged to have exceeded the predetermined repose time (8 ms), in other words, the input of the step pulses is judged to have been finished at the step 100.

On the other hand, if a series of step pulses have been input, the repose time exceeds the predetermined value (8 ms), so that a new delay time for an inner step pulse is set at the input of the next step pulse.

Figure 2:
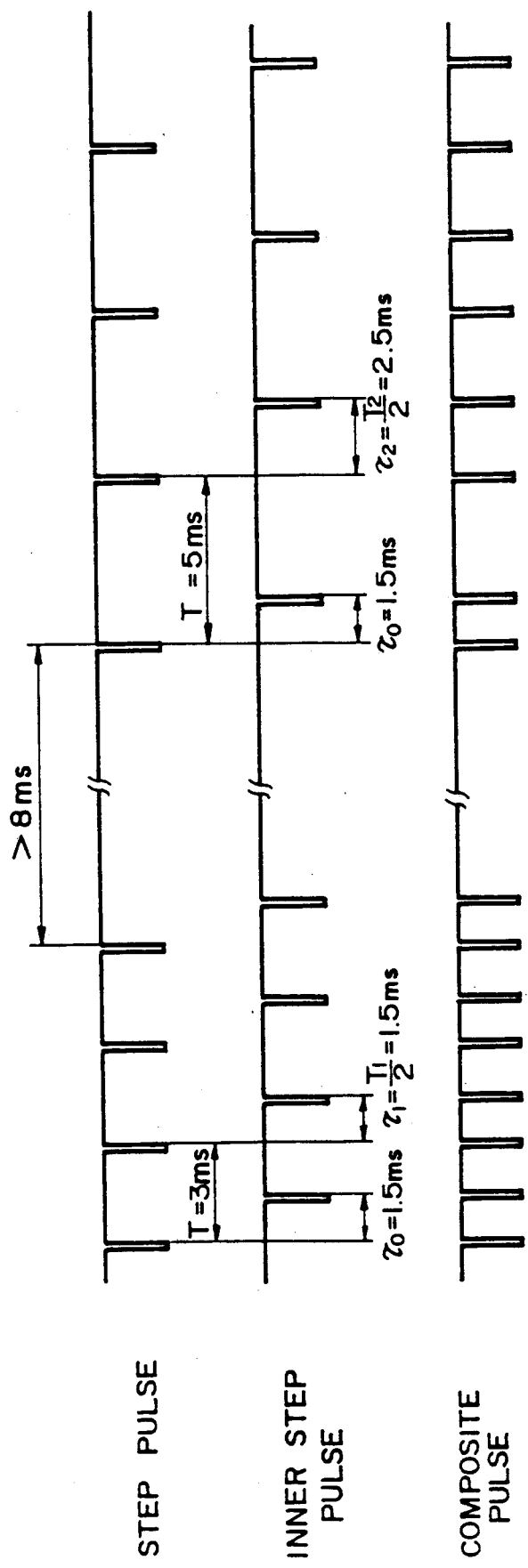
FIG. 2 is a timing chart of a step pulse compounding operation in the embodiment shown in FIG. 1.

FIG. 2 shows the state in which step pulses are supplied at an interval $T_1 = 3$ ms and an interval $T_2 = 5$ in accordance with first and second seek commands, respectively. As is clear from FIG. 2, in each series of step pulses, the predetermined initial value $\tau_0 = 1.5$ ms is provided for the first step pulse, but a delay time $\tau_1 = 1.5$ ms and a delay time $\tau_2 = 2.5$ ms obtained by calculation in accordance with the change of the pulse interval are respectively set for the second and later step pulses.

As is clear from the timing chart of FIG. 2, the rotor of the stepping motor is smoothly rotated by the advancement of the shaft in angular steps at very stable regular intervals.

Figure 3:
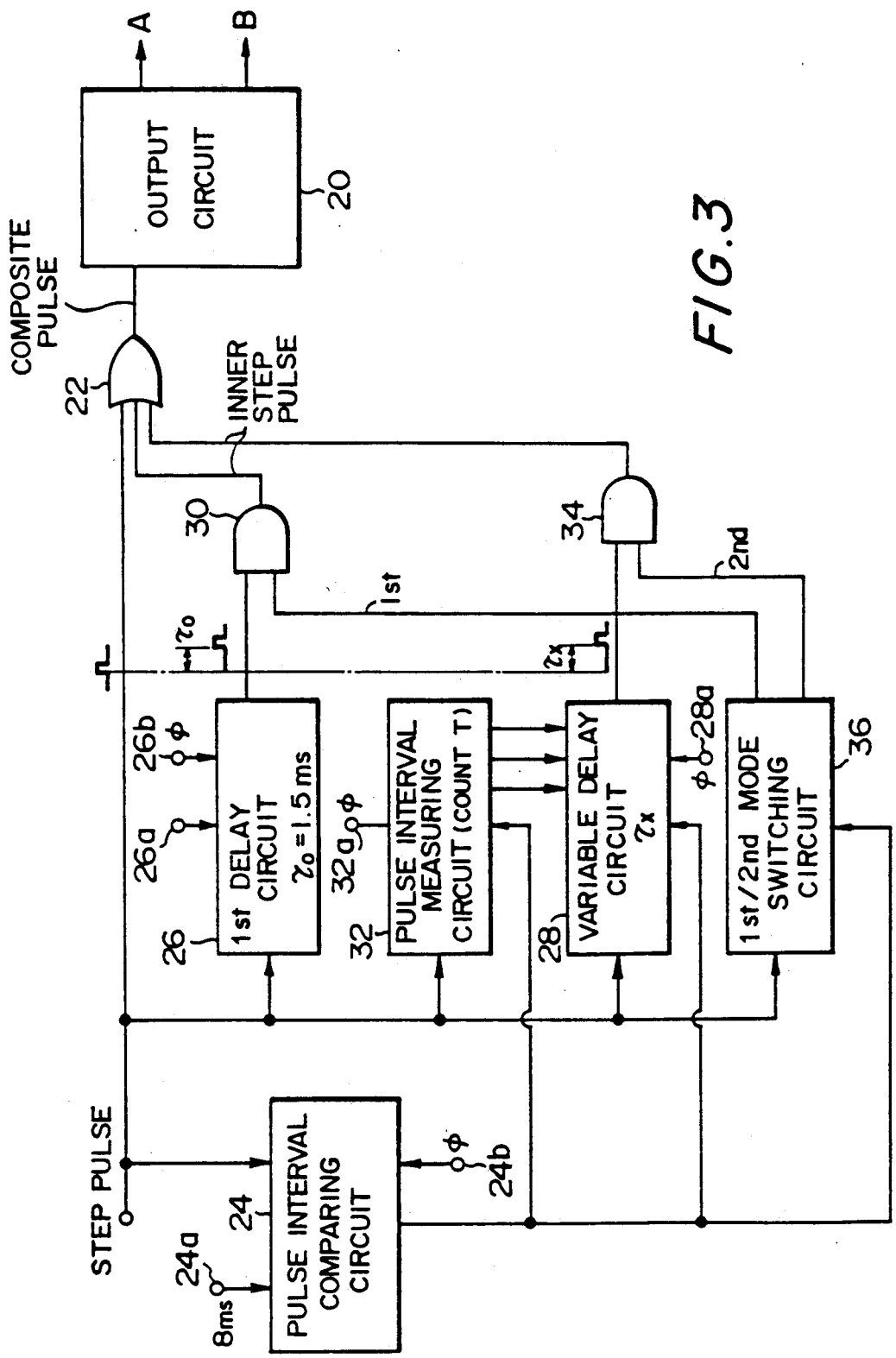
FIG. 3 is a schematic block diagram of the structure of the drive circuit of the embodiment shown in FIG. 1.

FIG. 3 shows an embodiment of a drive circuit according to the present invention for executing the above-described driving operation. A step pulse is compounded with an inner step pulse and is supplied to an output circuit 20 as a composite pulse train.

Figure 6:
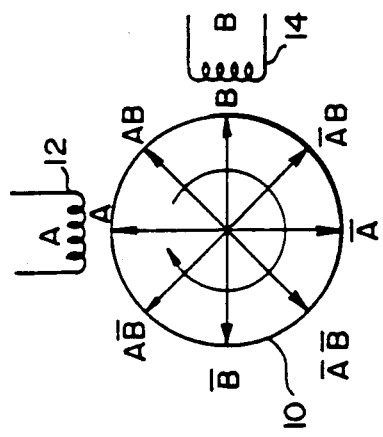
FIG. 6 is an explanatory view of the structure and the positioning phases of a conventional stepping motor.
Figure 7:
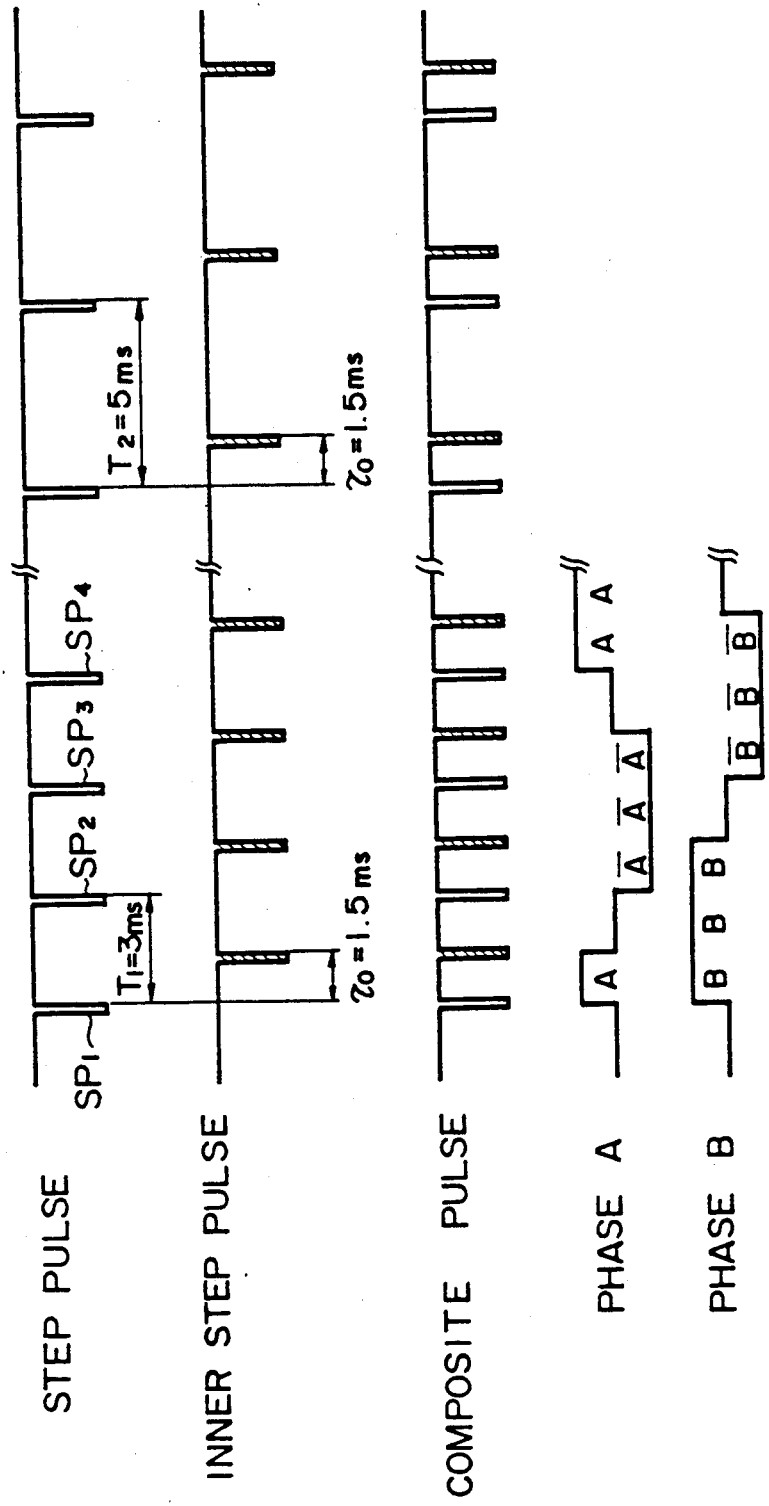
FIG. 7 is a driving timing chart in the conventional stepping motor shown in FIG. 6.

The output circuit 20 is a circuit for supplying A-phase and B-phase excitation signals to the exciting coils of the stepping motor by a predetermined combination of a forward driving current and a reverse driving current in the same way as in the conventional apparatus shown in FIGS. 6 and 7. Since the output circuit itself is the same as a conventionally known one, explanation thereof will be omitted.

In this embodiment, an OR gate 22 is provided so as to compound a step pulse and an inner step pulse, and a step pulse and an inner step pulse which are output at different timings are introduced to the output circuit 20.

A pulse interval comparing circuit 24 is provided in order to detect the waiting period in which the reception of a series of step pulses has been finished and the repose time for waiting for the next command has set in. A step pulse is supplied to the pulse interval comparing circuit 24 and judgment is made as to whether the input of the series of step pulses is continued or the repose time has set in by comparing the time elapsed after the input of the step pulse with a predetermined value.

For this purpose, the predetermined value which is the reference value for comparison is input to an input terminal 24a of the pulse interval comparing circuit 24. In this embodiment, since 8 ms is used for the judgment as to the repose time, the reference value corresponding to 8 ms is supplied.

The reference value supplied to the terminal 24a is preferably made adjustable as desired by the user such that the reference value is changed from the outside of the drive circuit.

The pulse interval comparing circuit 24 has a counter and a comparator, and the counting operation is initiated at the input of the first step pulse in a series and finished at the input of the subsequent step pulse so as to measure the pulse interval as the count value. The count value is represented by the reference clock pulse $\phi$ input from a terminal 24b. Therefore, it is possible to continuously measure the interval of step pulses by repeating the start/stop of the counter every time a step pulse is input.

The count value is compared with the reference value, and when the pulse interval exceeds 8 ms in this embodiment, a reset signal is output to each of the circuit which will be described later on the judgment that the input of the series of step pulses has been finished and the repose time for waiting for the next command has set in.

In order to form an inner step pulse, a step pulse is delayed by a predetermined time, as described above, and in order to output the first inner step pulse at a fixed delay time and control the subsequent delay times in correspondence with the respective step pulse intervals, two delay circuits are provided in this embodiment as a first delay circuit 26 and a variable delay circuit 28.

The first delay circuit 26 outputs an inner step pulse a predetermined time behind the first step pulse in a series of input step pulses. For this purpose, a delay time designating signal is supplied from the outside to a terminal 26a of the first delay circuit 26 so as to adjust the delay time.

In this embodiment, the delay time is set at 1.5 ms, and the fixed initial delay time can be freely adjusted in accordance with the signal output from the outside. The clock pulse $\phi$ is supplied to the terminal 26b of the first delay circuit 26 in order to execute the delaying operation. In this embodiment, since all the processing is digitally executed except for the output circuit 20, the desired delaying operation is performed by counting the clock pulse $\phi$ at the terminal 26a for the predetermined delay time.

In this way, an inner step pulse is output from the first delay circuit 26 the predetermined fixed delay time $\tau_0$ (1.5 ms) behind the step pulse, as shown in FIG. 3, and the inner step pulse is supplied to the OR gate 22 through an AND gate 30.

The variable delay circuit 28 can set various delay times in accordance with the interval of step pulses, as is clear from the above explanation. The delay time is determined by the output from a pulse interval measuring circuit 32.

The clock pulse $\phi$ is also supplied from a terminal 28a to the variable delay circuit 28, and the desired delay time is obtained from the count value of the clock $\phi$ in the same way as in the first delay circuit 26.

Therefore, an inner step pulse is output from the variable delay circuit 28 $\tau_x$ behind the step pulse, as shown in FIG. 3, and the inner step pulse is supplied to the OR gate 22 through an AND gate 34.

The pulse interval measuring circuit 32 measures the pulse interval in a series of step pulses and supplies the delay time corresponding to the pulse interval to the variable delay circuit 28. In this embodiment, the interval between the first two step pulses in a series is measured. The pulse interval measuring circuit 32 itself is composed of a digital counter and measures the desired pulse interval by measuring the interval between the first two step pulses and the result of measurement is supplied to the variable delay circuit 28 as the count value of the clock pulse $\phi$. The delay time in the variable delay circuit 28 may naturally be adjusted every time the interval between the respective step pulses is measured or a plurality of times by measuring a plurality of intervals between the step pulses selected from all the step pulses. If a plurality of delay time commands are output in this way, the generation of a large error is advantageously prevented even if a step pulse is missed.

In this way, the first delay time at the input of the first step pulse and the delay time at the input of the second and later step pulses are determined and the inner step pulses having the respective delay times are compounded with the respective step pulses.

In this embodiment, in order to select between the inner step pulse from the first delay circuit 26 and the inner step pulse from the variable delay circuit 28, a first/second mode switching circuit 36 is provided which is composed of a circuit for setting up a flag by counting the step pulses.

The mode switching circuit 36 supplies a signal "H" for 2.0 ms which is slightly longer than the delay time in the first delay circuit 26 to the AND gate 30, and thereafter supplies a signal "L" to the AND gate 34 and closes the AND gate 30 to the second and later step pulses.

The mode switching circuit 36 supplies to the AND gate 34 an inversion signal of the signal which has output to the AND gate 30, whereby an inner step pulse is output at the variable delay time from the AND gate 34 to the OR gate 22 when the second or later step pulse is input.

In this way, either of the inner step pulses is compounded with the step pulse by the OR gate 22. When the series of step pulses has been input and the repose time sets in, the output of the pulse interval comparing circuit 24 is supplied to the variable delay circuit 28, the pulse interval measuring circuit 32 and the first/second mode switching circuit 36 so as to reset the respective circuits.

The variable delay circuit 28 outputs an inner step pulse at a predetermined delay time set by the pulse interval measuring circuit 32 during the input of the series of step pulses and when the repose time has set in, the delay time is reset and assumes the state of waiting for a new delay time to be set for the next series of step pulses.

The pulse interval measuring circuit 32 resets the measured value when the input of the series of step pulses is finished and prepares for the measurement of the pulse interval of the next series of step pulses which is to be carried out under the next command.

The mode switching circuit 36 sets down the flag when the input of the series of step pulses is finished and waits for the input of the first step pulse of the next series.

In this way, according to the present invention, it is possible to compound an inner step pulse having the optimum delay time what corresponds to the pulse interval of a step pulse with the input step pulse.

Although one inner step pulse is inserted at an intermediate position between the input step pulses in this embodiment, it is also possible to insert a plurality of inner step pulses between the respective step pulses at regular intervals by the actual measurement of the step pulse interval and the subsequent calculation in accordance with the present invention. It is also possible to insert an inner step pulse at a position shifted from the intermediate position of step pulses by a given distance by obtaining the delay time from a given operation expression. Thus, driving corresponding to the characteristics necessary for a stepping motor is enabled.

Figure 4:
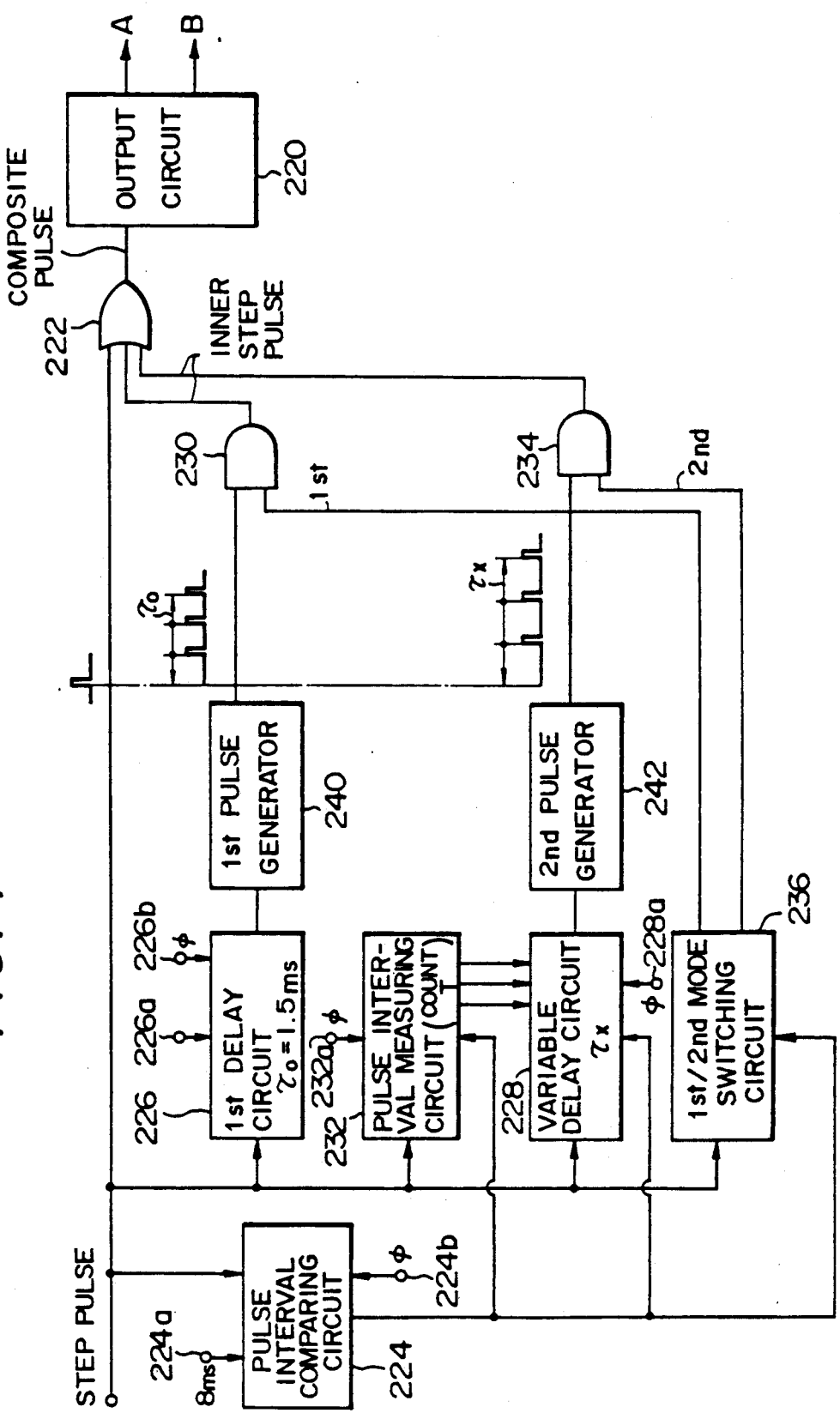
FIG. 4 is a block diagram of the structure of another embodiment of a drive circuit according to the present invention which carries out four-step seeking.

FIG. 4 shows another embodiment of the present invention in which three inner step pulses are inserted between each pair of step pulses at regular intervals. The same elements as those in the embodiment shown in FIG. 3 are indicated by the same numerals prefixed by the numeral 2.

This embodiment is characterized in that the outputs of a first delay circuit 226 and a variable delay circuit 228 are supplied to a first pulse generator 240 and a second pulse generator 242, respectively.

The pulse generators 240 and 242 are composed of respective circuits for outputting a plurality of pulses at the delay times indicated in this embodiment. In this embodiment, three pulses are output to corresponding AND gates 230 and 234, respectively.

The first pulse generator 240 supplies three pulses to the AND gate 230 at the delay time set by the first delay circuit 226 every time a step pulse is applied. Similarly, the second pulse generator 242 supplies three pulses to the AND gate 234 at the delay time set by the variable delay circuit 228 every time a step pulse is applied.

In the embodiment shown in FIG. 4, shorter delay times than those in the first embodiment are set in the delay circuits 226 and 228 in correspondence with four-step seeking.

If the shortest interval of input step pulses is set at 3 ms in this embodiment, the fixed delay time in the first delay circuit 226 is set at 0.75 ms.

Figure 5:
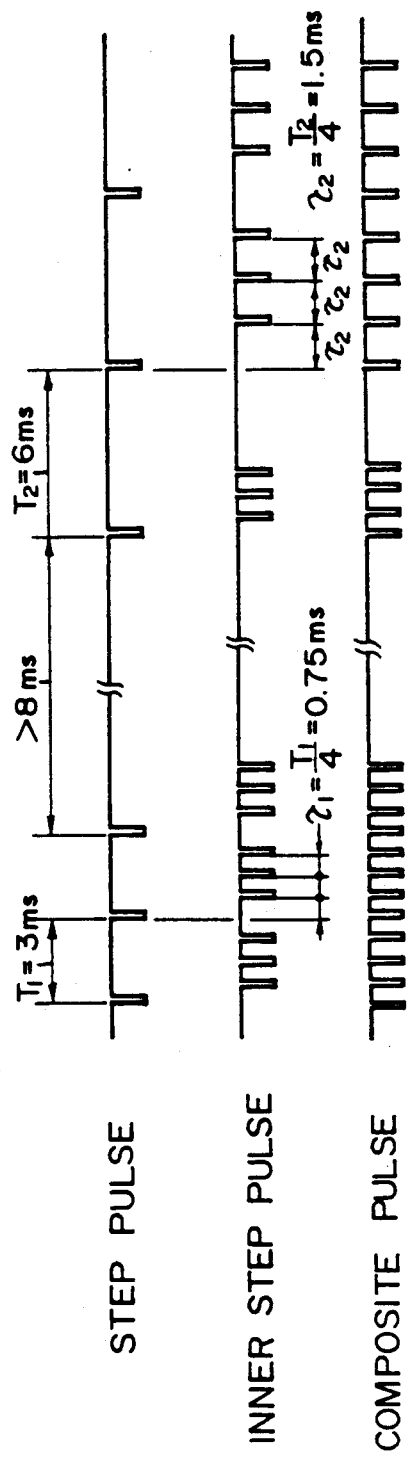
FIG. 5 is a timing chart of a step pulse compounding operation in the embodiment shown in FIG. 4.

FIG. 5 shows the pulse compounding operation for the four-step seeking in correspondence with the compounding operation shown in FIG. 2. A series of step pulses are first supplied at an interval of 3 ms and, after the repose time, the next series of step pulses are supplied at an interval of 6 ms.

The variable delay circuit 228 supplies a delay time of 0.75 ms for the first series of step pulses to the second pulse generator 242, as shown in FIG. 5.

Since the pulse interval of the next series of step pulses is 6 ms, the variable delay circuit 228 supplies a delay time of 1.5 ms to the second pulse generator 242.

In this way, in both series of step pulses, it is possible to supply composite pulse trains for at least the second and later step pulses to the output circuit 220 at four-step seeking at regular intervals.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A drive circuit for a stepping motor comprising:
   a. a means for measuring the interval between input step pulses;
   b. a variable delaying means for determining a predetermined amount of delay on the basis of the measured pulse interval;
   c. a means for generating an interleaved step pulse with a timing delayed by said predetermined amount after receiving said input step pulse;
   d. a means for compounding said input step pulse and said interleaved step pulse; and
   e. an output means for supplying exciting currents to the exciting coils of said stepping motor on the basis of the compounded pulse train.

2. A drive circuit for a stepping motor according to claim 1, wherein said interleaved step pulse is inserted substantially in the middle of step pulses.

3. A drive circuit for a stepping motor according to claim 1, wherein a plurality of said interleaved step pulse are inserted between step pulses at substantially regular intervals.

4. A drive circuit for a stepping motor comprising:
   a. a means for measuring the interval between the input step pulses;
   b. a variable delaying means for determining a predetermined amount of delay on the basis of the measured pulse interval;
   c. a means for generating an interleaved step pulse with a timing delayed by said predetermined amount after receiving said input step pulse;
   d. a means for compounding said input step pulse and said interleaved step pulse;
   e. an output means for supplying exciting currents to the exciting coils of said stepping motor on the basis of the compounded pulse train;
   f. a first delaying means for delaying the first step pulse by a predetermined fixed amount of delay and outputting the delayed step pulse as an interleaved step pulse; and
   g. A first/second mode switching means for detecting the first step pulse and the later step pulses in a step pulse train and selectively switching between said first delaying means and said variable delaying means.

5. A drive circuit for a stepping motor according to claim 4, wherein said interleaved step pulse is inserted substantially in the middle of step pulses.

6. A drive circuit for a stepping motor according to claim 4, wherein a plurality of said interleaved step pulses are inserted between step pulses at substantially regular intervals.

7. A drive circuit for a stepping motor according to claim 4, wherein said fixed amount of delay is adjustable from the outside.

8. A drive circuit for a stepping motor comprising:
   a. a means for measuring the interval between the step pulses input;
   b. a means for generating an interleaved step pulse with a timing delay by a predetermined amount after receiving the step pulse input, including a variable delaying means for determining a predetermined amount of delay on the basis of the measured pulse interval, and a first delaying means for delaying the first step pulse by a predetermined fixed amount of delay and outputting the delayed step pulse as an interleaving step pulse;
   c. a means for compounding said input step pulse and said interleaved step pulse;
   d. an output means for supplying exciting currents to the exciting coils of said stepping motor on the basis of the compounded pulses;
   e. a first/second mode switching means for detecting the first step pulse and the later step pulses in a step pulse train and selectively switching between said first delaying means and said variable delaying means; and
   f. A means for comparing said step pulse interval of step pulses with a predetermined value so as to detect the end of said step pulse train and resetting said means for measuring the interval between the step pulses input, said variable delaying means and said first/second mode switching means.

9. A drive circuit for a stepping motor according to claim 8, wherein said interleaved step pulse is inserted substantially in the middle of step pulses.

10. A drive circuit for a stepping motor according to claim 8, wherein a plurality of said interleaved step pulses are inserted between step pulses at substantially regular intervals.

11. A drive circuit for a stepping motor according to claim 8, wherein said fixed amount of delay is adjustable from the outside.

12. A drive circuit for a stepping motor according to claim 8, wherein said predetermined value compared as the reference value with said pulse interval is adjustable from the outside.

* * * * *